United States Patent [19]

Yu

[11] Patent Number: 5,819,930
[45] Date of Patent: Oct. 13, 1998

[54] CONTAINER FOR CASSETTE OR THE LIKE

[76] Inventor: Jack Yu, No. 109-1, Avenue 6, Lane 164, Tzong Sa Road, Da Du Hsiang, Taichung Hsien, Taiwan

[21] Appl. No.: 931,333

[22] Filed: Sep. 16, 1997

Related U.S. Application Data

[63] Continuation-in-part of Ser. No. 774,678, Dec. 26, 1996, Pat. No. 5,706,939.

[51] Int. Cl.$^6$ ..................................... B65D 85/30
[52] U.S. Cl. ...................... 206/308.1; 206/310; 206/512; 312/9.22
[58] Field of Search .............................. 206/308.1, 310, 206/311, 309, 493, 511, 512; 312/9.16, 9.19, 9.22, 9.41, 9.64, 9.11, 9.21, 9.26, 9.47, 9.48

[56] References Cited

U.S. PATENT DOCUMENTS 3,544,021  12/1970  Wilson ....................................... 229/30
4,702,533  10/1987  Seifert ......................................... 312/12
4,747,484   5/1988  Ackeret ..................................... 206/387
4,993,558   2/1991  Assael ........................................ 211/40

*Primary Examiner*—Paul T. Sewell
*Assistant Examiner*—Nhan T. Lam
*Attorney, Agent, or Firm*—Charles E. Baxley, Esq.

[57] ABSTRACT

A container includes a cover secured on a base for receiving an insert and a casing disposed on one of the corners of the base for slidably receiving a knob. A latch is slidably engaged in the base for being biased to engage with the insert and for retaining the insert in place. The knob includes a tapered surface for disengaging the latch from the insert and for allowing the container to be operated with only one hand. The knob can be prevented from being depressed inward of the cover inadvertently when a number of containers are stacked with each other.

3 Claims, 5 Drawing Sheets

CONTAINER FOR CASSETTE OR THE LIKE

The present invention is a continuation-in-part of U.S. patent application Ser. No. 08/774,678, filed Dec. 26, 1996, now U.S. Pat. No. 5,706,939.

BACKGROUND OF THE INVENTION

1. Field of the Invention

The present invention relates to a container, and more particularly to a container for storing tape cassettes or the like.

2. Description of the Prior Art

Typical disc containers comprise a base for storing disc and a cover pivotally coupled to the base for covering the disc. However, the user have to use both hands for opening the typical disc container.

The present invention has arisen to mitigate and/or obviate the afore-described disadvantages of the conventional disc containers.

SUMMARY OF THE INVENTION

The primary objective of the present invention is to provide a container that may be easily opened and closed.

In accordance with one aspect of the invention, there is provided a container for tape cassette comprising a base including a front portion having a first corner area and including a rear portion, the base including a casing provided on the first corner area of the base, an insert slidably engaged in the base, the insert including a notch, a cover secured on the base for retaining the insert in the base, means for biasing the insert forward and outward of the base, a latch slidably engaged in the base for engaging with the notch of the insert and for retaining the insert in place, means for biasing the latch to engage with the notch of the insert and for retaining the insert in place, and means for disengaging the latch from the notch of the insert and for allowing the insert to be biased forward and outward of the base and for allowing the container to be operated by only one hand of the user. The knob is biased forward of the base such that the knob may be easily operated even when a number of containers are stacked or superposed with each other. The knob will not be depressed by the other containers when a number of containers are stacked or superposed with each other.

The latch includes an extension extended upward, the latch disengaging means includes a knob slidably engaged in the casing and having a tapered surface for engaging with the extension and for moving the latch away from the insert and for disengaging the latch from the notch of the insert when the knob is depressed inward of the casing.

The latch biasing means includes a pin provided on the first corner area of the base, and a spring engaged on the pin and having a leg engaged with the latch for biasing the latch to engage with the notch of the insert.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
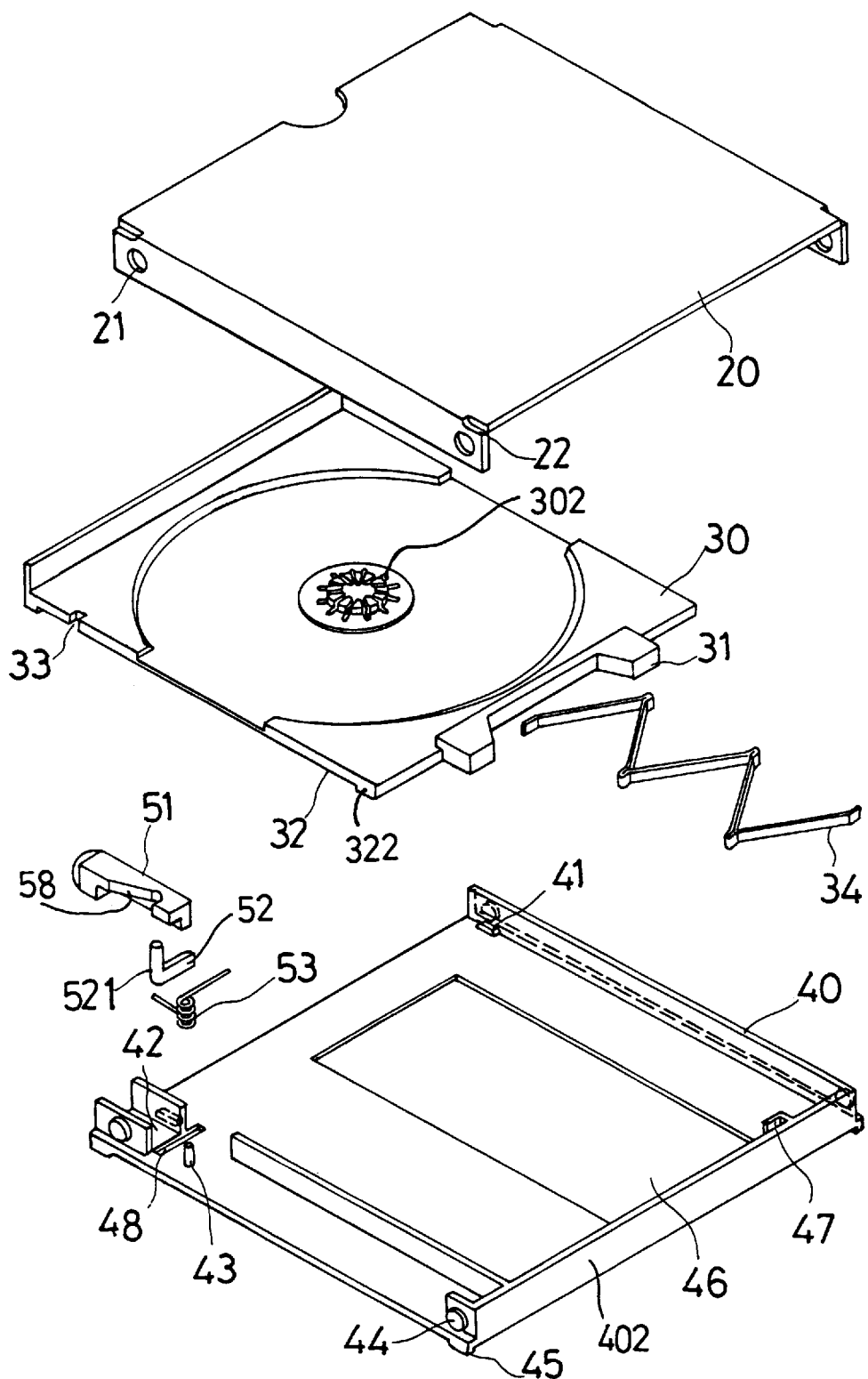
FIG. 1 is an exploded view of a container in accordance with the present invention.

Referring to the drawings, and initially to FIGS. 1 to 4, a container in accordance with the present invention comprises a base 40 including four projections 44 provided on the four corner areas and including a rear portion having a wall 402 extended upward. A cover 20 includes four holes 21 for engaging with the projections 44 and for allowing the cover 20 to be easily secured to the base 40. The base 40 includes a depression 46 formed in the bottom and includes a retainer 47 formed in the wall 402. The base 40 includes four bulges 45 extended downward from the four corners for engaging with the depressions 22 of the cover 20 and for allowing two or more containers to be stably stacked with each other. The base 40 includes two protrusions 41 provided on the front corners respectively. The cover 20 includes four depressions 22 formed in top of the four corners.

A casing 42 is disposed on one of the front corners of the base 40 for slidably receiving a knob 51 which includes a tapered surface 58. A channel 48 and a pin 43 are provided behind the casing 42. A latch 52 is slidably engaged in the channel 48 and includes an extension 521 extended upward for engaging with the tapered surface 58. A spring 53 is engaged on the pin 43 and includes one leg engaged with the knob 50 for biasing the knob 50 outward of the casing 42 and includes the other leg engaged with the latch 52 for biasing the extension 521 of the latch 52 to engage with the tapered surface 58 of the knob 50.

An insert 30 is slidably engaged between the base 40 and the cover 20 and includes a flexible disc retaining hub 302 provided in the center portion. The cover 20 may stably retain the insert 30 in the base 40. The insert 30 includes a seat 31 for engaging with a spring 34 which is engaged between the insert 30 and the wall 402 for biasing the insert 30 outward of the base 40. The spring 34 has one end engaged with the retainer 47. The insert 30 includes two shoulders 32 formed in the side portion for slidably engaging with the protrusions 41 of the base 40 and for guiding the sliding movement of the insert 30 relative to the base 40. The insert 30 includes two stops 322 for engaging with the protrusions 41 and for preventing the insert 30 from disengaging from the container. The insert 30 includes a notch 33 for engaging with the latch 52 which may retain the insert 30 in the base 40.

Figure 2:
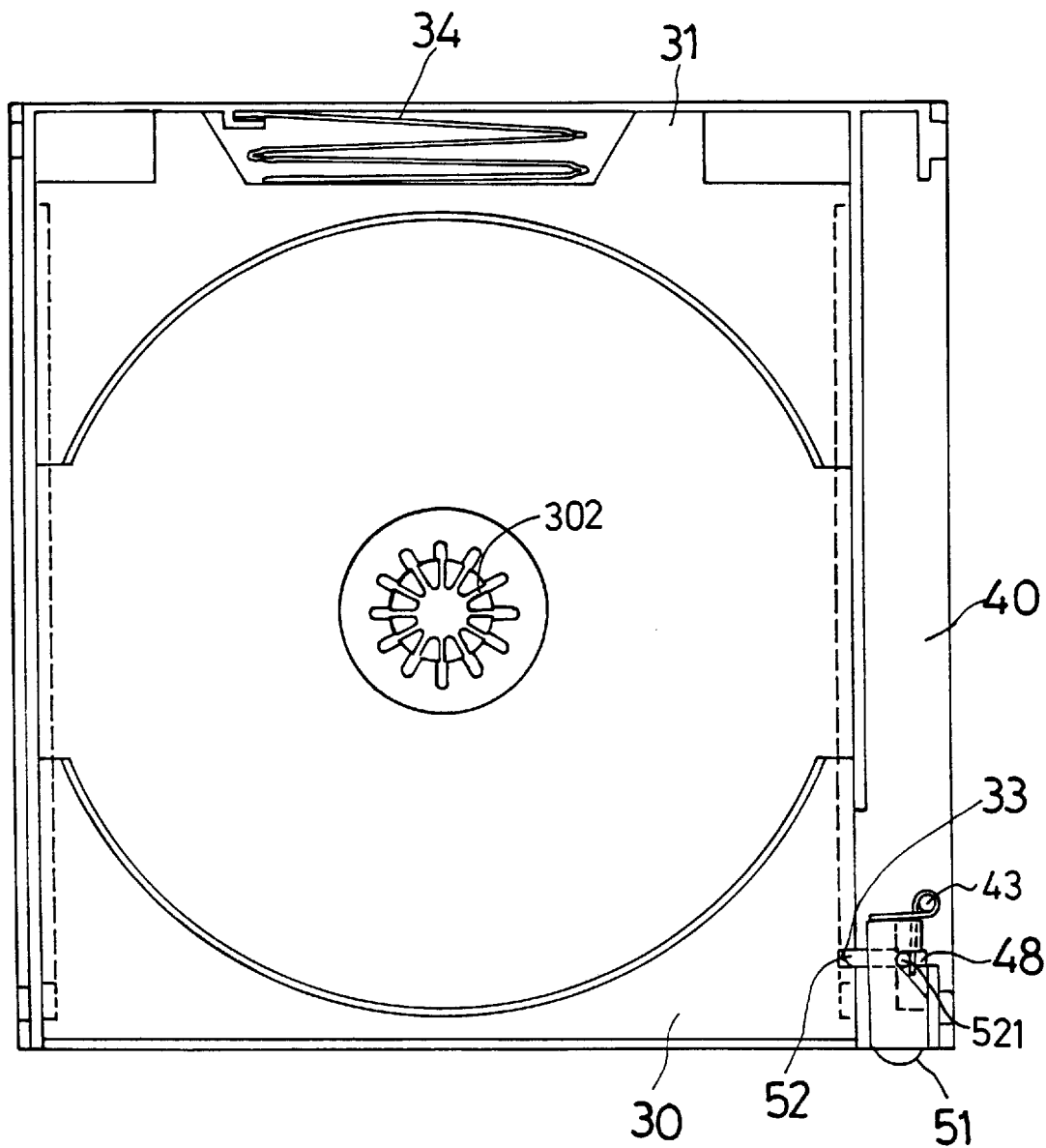
FIG. 2 is a top plane view of the container, in which the cover is removed for showing the interior structure of the container.
Figure 3:
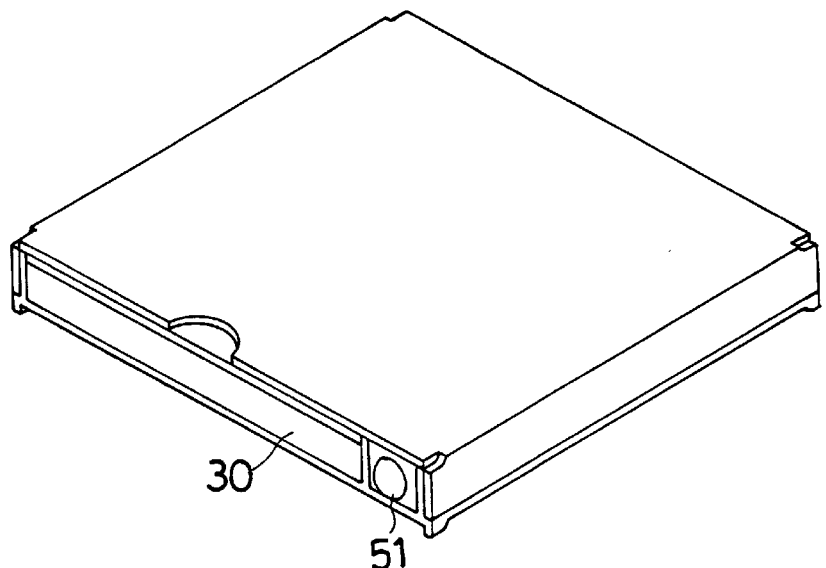
FIGS. 3 and 4 are perspective views illustrating the operation of the container, in which the container is rotated for 180 degrees relative to FIG. 1.
Figure 4:
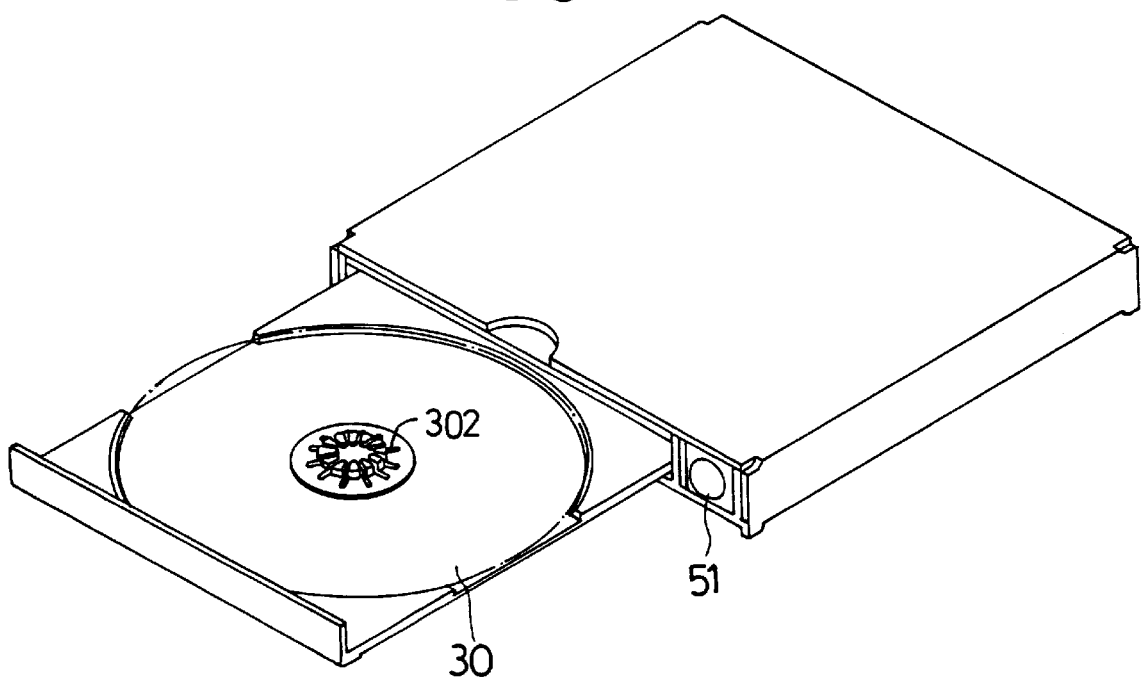

In operation, as shown in FIGS. 2–4, when the insert 30 is moved inward of the base 40, the latch 52 may be biased by the spring 53 to engage with the notch 33 of the insert 30 for retaining the insert 30 in the base 40. However, when the knob 51 is depressed inward of the cover 20, the tapered surface 58 of the knob 51 may move the latch 52 away from the insert 30 against the spring 53 for disengaging the latch 52 from the notch 33 of the insert 30 and for allowing the insert 30 to be moved outward of the base 40 by the spring 34, such that the container may be easily opened with only one hand.

Figure 5:
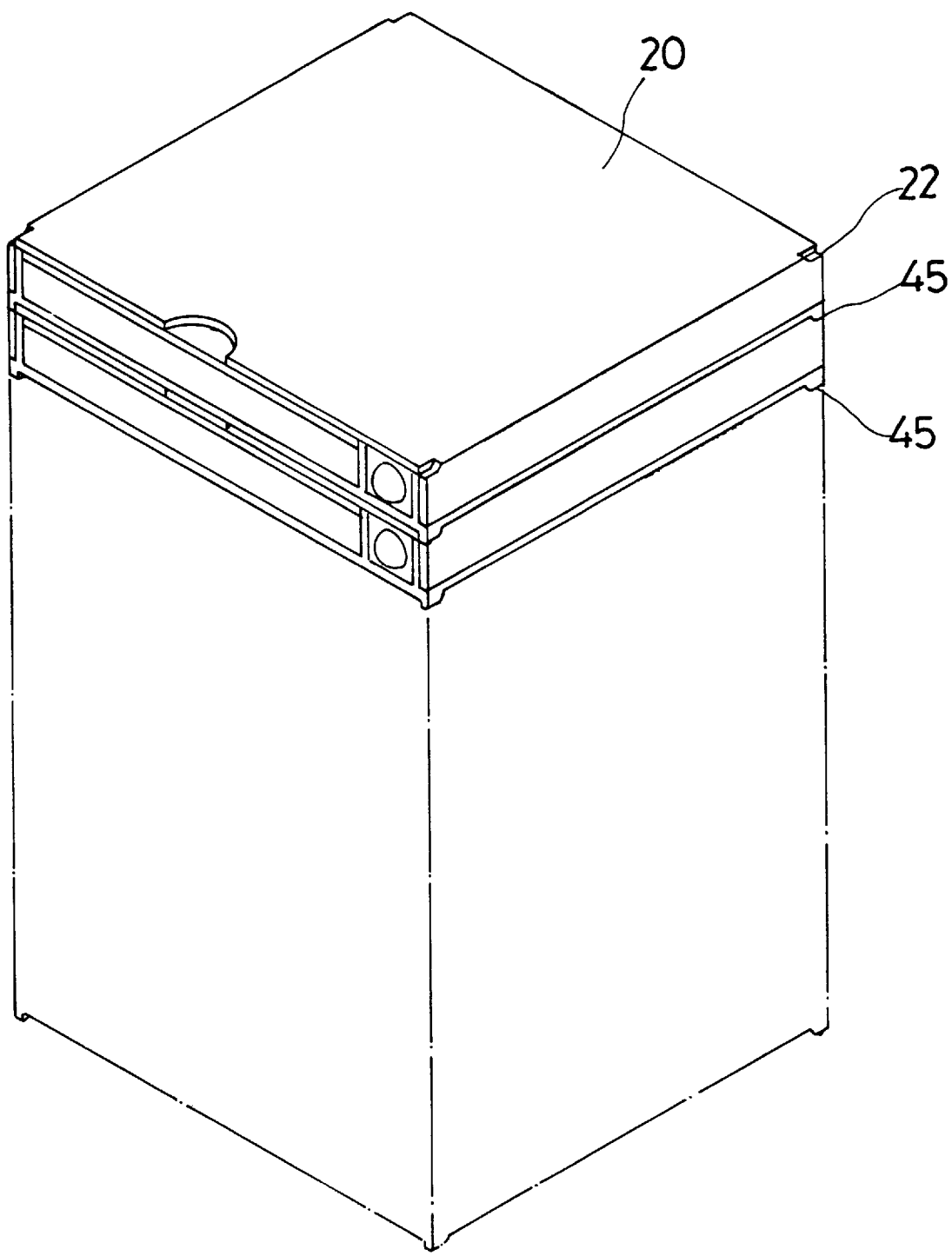
FIGS. 5 and 6 are perspective views illustrating the operation of the container.
Figure 6:
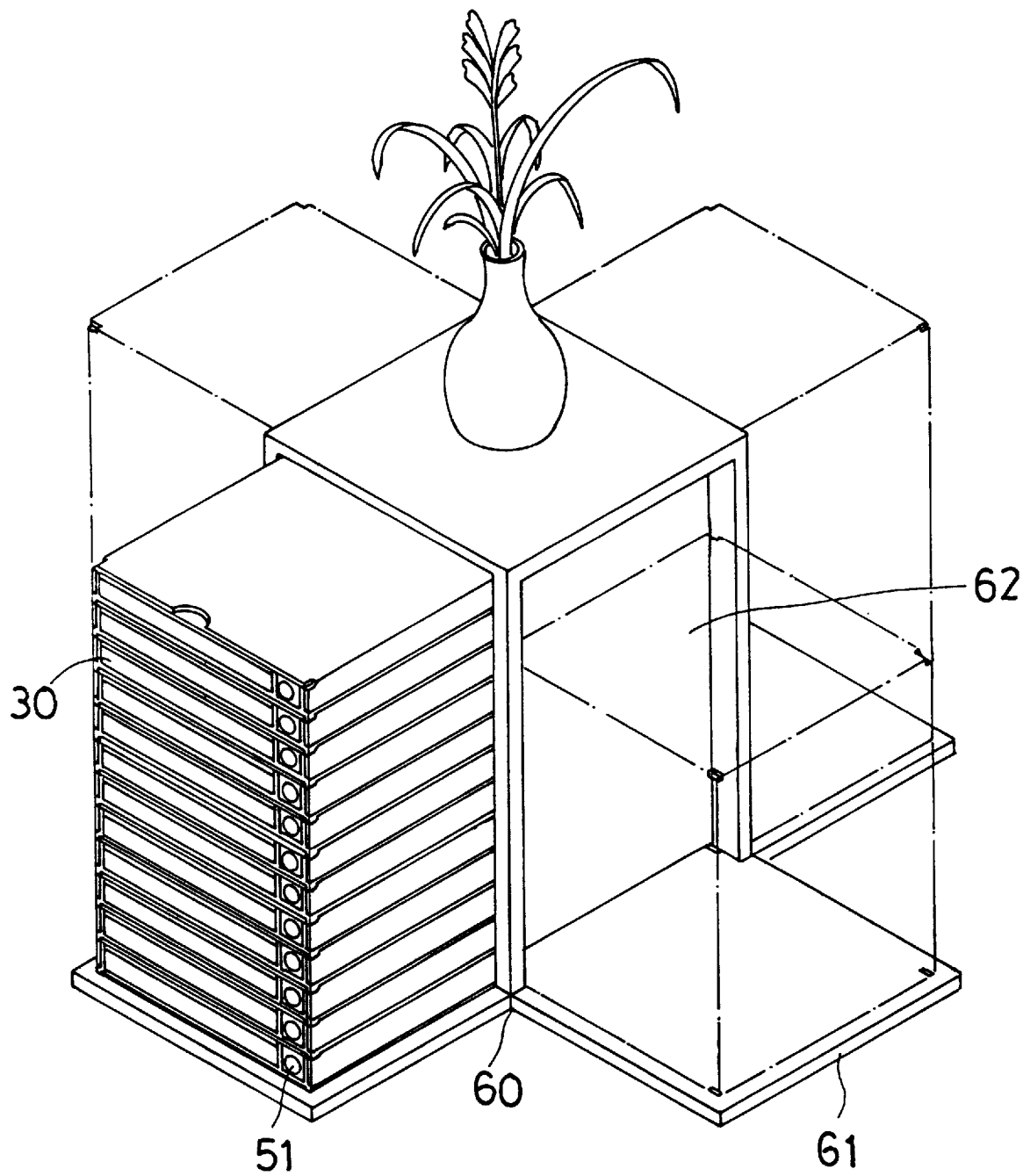

As shown in FIGS. 5 and 6, the knob 51 may be easily depressed by the user when the containers are superposed with each other such that the insert 30 of the middle containers may also be easily opened.

Accordingly, the container in accordance with the present invention includes an insert which may be easily opened and operated with only one hand even when a number of containers are superposed with each other. In addition, the knob 51 is facing forward and may thus be prevented from being depressed inward of the cover 20 by the other containers when a number of containers are stacked or superposed with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A container comprising:

a base including a front portion having a first corner area and including a rear portion, said base including a casing provided on said first corner area of said base;

an insert slidably engaged in said base, said insert including a notch;

a cover secured on said base for retaining said insert in said base;

means for biasing said insert forward and outward of said base;

a latch slidably engaged in said base for engaging with said notch of said insert and for retaining said insert in place;

means for biasing said latch to engage with said notch of said insert and for retaining said insert in place; and means for disengaging said latch from said notch of said insert and for allowing said insert to be biased forward and outward of said base.

2. The container according to claim 1, wherein said latch includes an extension extended upward, said latch disengaging means includes a knob slidably engaged in said casing and having a tapered surface for engaging with said extension and for moving said latch away from said insert and for disengaging said latch from said notch of said insert when said knob is depressed inward of said casing.

3. The container according to claim 1, wherein said latch biasing means includes a pin provided on said first corner area of said base, and a spring engaged on said pin and having a leg engaged with said latch for biasing said latch to engage with said notch of said insert.

* * * * *